United States Patent [19]
Kumar

[11] Patent Number: 5,560,763
[45] Date of Patent: Oct. 1, 1996

[54] INTEGRATED AIR SEPARATION PROCESS

[75] Inventor: Ravi Kumar, Allentown, Pa.

[73] Assignee: The BOC Group, Inc., New Providence, N.J.

[21] Appl. No.: 450,766

[22] Filed: May 24, 1995

[51] Int. Cl.$^6$ .................................................. B01D 53/047
[52] U.S. Cl. ........................... 95/98; 95/105; 95/106; 95/139
[58] Field of Search .................. 62/18, 24, 32, 62/34; 95/96–99, 104–106, 139

[56] References Cited

U.S. PATENT DOCUMENTS

| | | | |
|---|---|---|---|
| 3,594,984 | 7/1971 | Toyama et al. | 95/126 |
| 3,788,037 | 1/1974 | Shell et al. | 95/99 |
| 4,249,915 | 2/1981 | Sircar et al. | 95/99 |
| 4,367,082 | 1/1983 | Tomisaka et al. | 62/18 X |
| 4,375,367 | 3/1983 | Prentice | 62/18 X |
| 4,731,102 | 3/1988 | Yoshino | 62/18 X |
| 4,732,596 | 3/1988 | Nicholas et al. | 62/18 |
| 4,752,311 | 6/1988 | MacLean et al. | 62/18 |
| 4,806,136 | 2/1989 | Kiersz et al. | 62/18 |
| 4,957,523 | 9/1990 | Zarate et al. | 62/18 X |
| 4,969,935 | 11/1990 | Hay | 95/98 |
| 5,220,797 | 6/1993 | Krishnamurthy et al. | 62/18 X |
| 5,287,704 | 2/1994 | Rathbone | 62/25 |
| 5,379,598 | 1/1995 | Mostello | 62/24 |
| 5,396,772 | 3/1995 | McKeigue et al. | 62/22 |
| 5,461,872 | 10/1995 | Mostello | 62/24 |
| 5,463,869 | 11/1995 | Kumar et al. | 62/18 X |
| 5,470,543 | 11/1995 | Nagamura et al. | 62/18 X |
| 5,471,842 | 12/1995 | Mostello et al. | 62/24 |

*Primary Examiner*—Robert Spitzer
*Attorney, Agent, or Firm*—David M. Rosenblum; Larry R. Cassett

[57] ABSTRACT

An air separation method in which a pre-purification unit is provided with three or more beds which are subjected to a pressure swing adsorption process. Each of the beds is subjected to feed, pressurization, purge and repressurization stages. The purge stages are conducted with a waste stream from the air separation unit and the duration of the purge stage is equal to the total time of the cycle divided by the number of beds.

10 Claims, 2 Drawing Sheets

2

INTEGRATED AIR SEPARATION PROCESS

BACKGROUND OF THE INVENTION

The present invention relates to an integrated air separation process in which a pre-purification unit is integrated with an air separation unit to remove impurities from the air prior to its separation. More particularly, the present invention relates to such a process in which the pre-purification unit contains adsorbent beds which operate in accordance with a pressure swing adsorption cycle. Even more particularly, the present invention relates to such a method in which the pressure swing adsorption cycle includes continuously subjecting the beds to a purge with a waste stream such as waste nitrogen.

Air is separated into its components by a variety of low temperature rectification processes. In accordance with such processes, air is compressed, cooled to a temperature suitable for its rectification, and then is introduced into an air separation unit which contains one or more columns in which the air is distilled into its component parts. The air separation unit can contain one or more distillation columns having trays or packing to provide intimate contact between vapor and liquid phases of the air to be separated.

In addition to oxygen, nitrogen and argon, the air also contains higher boiling components such as carbon dioxide, hydrocarbons and water. If these higher boiling components are not removed from the air prior to the cooling of the air, such components will condense during the cooling of the air and form ice in the main heat exchanger. Additionally, distillation columns tend to concentrate such higher boiling components as liquid column bottoms. In case of hydrocarbons, this can present an operational hazard. In order to prevent such problems, pre-purification units are provided that are integrated with the air separation plant in order to remove the higher boiling components such as moisture, carbon dioxide and hydrocarbons. Such pre-purification is effectuated by beds of adsorbent operating in accordance with pressure swing adsorption cycles.

A common pressure swing adsorption cycle has feed, depressurization, purge and re-pressurization stages. During the feed stage, compressed air is fed to a bed to produce a purified air stream which is then cooled in the main heat exchanger. After the feed stage is complete, the bed is depressurized to atmospheric pressure. The depressurization initiates adsorption of the adsorbed impurities from the adsorbent. Depressurization is completed by purging the bed with a waste stream, commonly waste nitrogen when available from a lower pressure column of a double column air separation unit. Thereafter, part of purified air from another bed undergoing a feed stage is routed to the bed that has just been subjected to a purge stage to repressurize the bed.

It is possible to use two beds which are operated out of phase such that while one bed is being fed, the other bed is regenerated and is therefore being subjected to depressurization, purge and repressurization stages. Even when more than two beds are used, the beds are only purged intermittently. As will be discussed, the inventor herein has found that operational efficiencies can be realized by operating a pressure swing adsorption cycle so that a waste stream is continuously being used to purge a bed undergoing the purge stage of the cycle.

SUMMARY OF THE INVENTION

The present invention provides an integrated air separation method. In accordance with this method, air is separated by compressing a feed air stream, cooling the feed air stream to a temperature suitable for its rectification and then rectifying the air so that a waste stream is produced. The waste stream is warmed prior to its further utilization. The feed air stream is pre-purified prior to the cooling thereof by pressure swing adsorption process. The pressure swing adsorption process comprises subjecting each of at least three adsorbent beds configured to adsorb impurities to a cycle including a feed stage to adsorb the impurities at pressure. Thereafter, the beds are regenerated by a depressurization stage to initiate desorption of the impurities, a purge stage to complete desorption of the impurities and a repressurization stage to repressurize each of the at least three beds back to the pressure. The purge stage is conducted by introducing the waste stream into each of the three adsorbent beds for the duration of the time interval equal to the total time interval of the cycle as applied to each of the least three beds divided by a total number of the adsorbent beds. As a result, the purge stream is continuously being used to subject a bed to a purge stage.

In a two bed system, since one bed is producing while another bed is being regenerated, there exists a time period in which, although available, the purge stream is not being used to purge a bed. Hence, the present invention requires three or more beds so that the purge stream is continuously being used. The effect of the present invention is to increase the amount of time that each bed is exposed to the purge stream so that the conclusion of the purge stream, more impurities have been desorbed from the bed than by prior art methods. As a result, more impurities can be adsorbed in the first instance. The application of the present invention is therefore to reduce the amount of adsorbent required for a pre-purification unit of an air separation plant.

BRIEF DESCRIPTION OF THE DRAWING

While the specification concludes with claims distinctly pointing out the subject matter that Applicant regards as the invention, it is believed that the invention will be better understood when taken in connection with the accompanying drawings in which:

DETAILED DESCRIPTION

Figure 1:
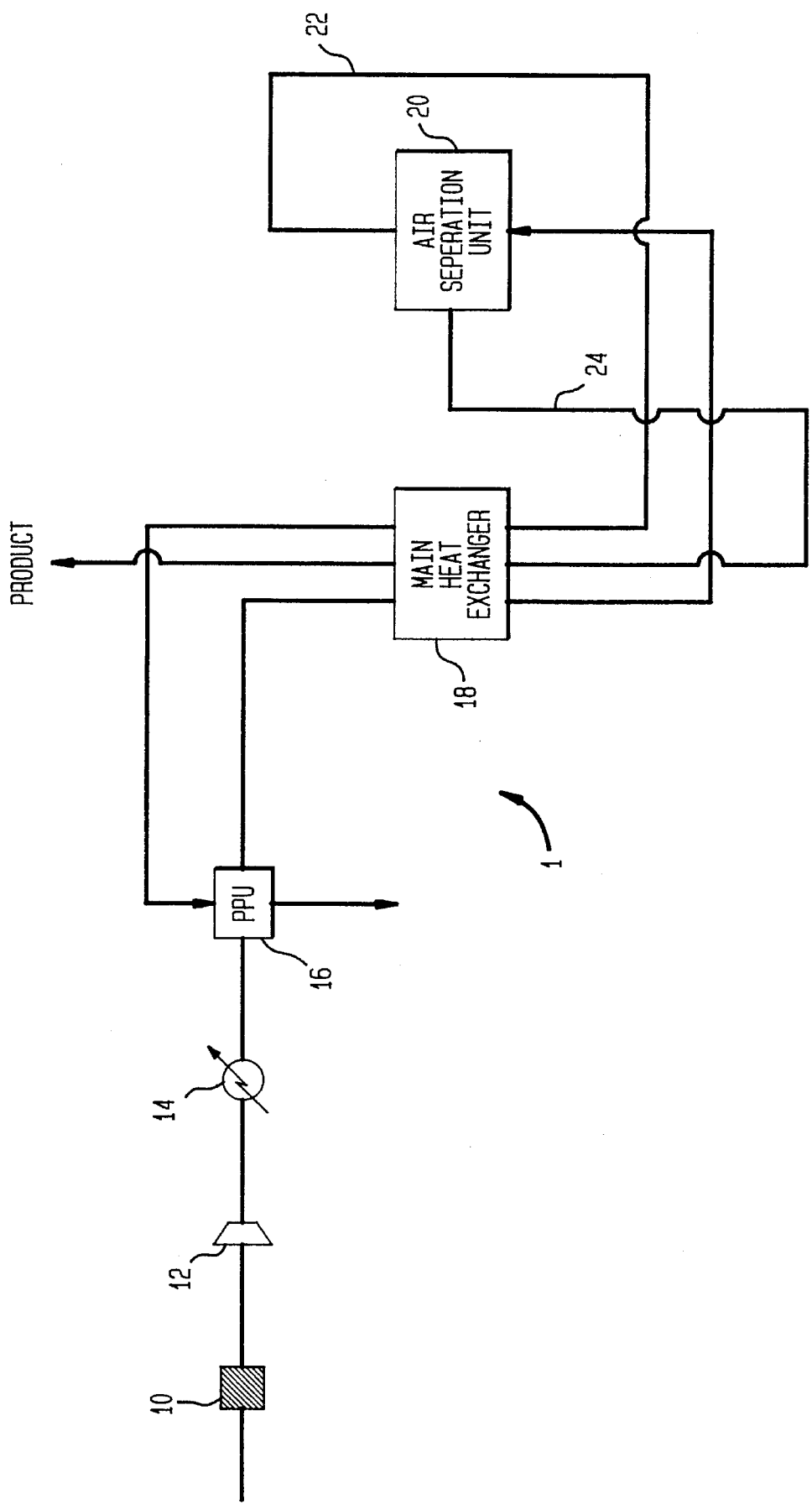
FIG. 1 is a schematic of an air separation plant for carrying out a method in accordance with the present invention.

With reference to FIG. 1 an air separation plant 1 is illustrated for separating air. Incoming air is filtered in a filter 10 to remove dust particles and the like and is then compressed in a compressor 12. The heat of compression produced through the compression of the air is removed by an aftercooler 14. Thereafter, the air is purified in a pre-purification unit 16 and is then cooled in a main heat exchanger 18 to a temperature suitable for its rectification within air separation unit 20.

Air separation unit 20 can consist of a single distillation column that is used to separate the air into an oxygen-rich liquid column bottoms and a nitrogen-rich or even a high-purity tower overhead. The present invention is not limited by the actual distillation process used or the number of distillation columns used in carrying out the process. For instance, air separation unit 20 could be a double column in which higher and lower pressure columns are operatively associated with one another by a condenser-reboiler. The compressed and cooled air would be introduced into the bottom of the higher pressure column to produce a nitrogen rich tower overhead and an oxygen-rich column bottoms, known in the art as crude liquid oxygen. The crude liquid oxygen would be further refined in the lower pressure column into a gaseous nitrogen tower overhead and a liquid oxygen column bottoms. Air separation unit 20 could also be a single column oxygen or nitrogen generator.

For purposes of explanation, it will be assumed that air separation unit 20 produces a waste nitrogen stream 22. However, if an oxygen were not desired, waste stream 22 could be formed from gaseous oxygen directly above the sump of a double column air separation unit. Additionally, air separation unit 20 produces a product stream 24 which in a manner well known in the art could be, liquid oxygen to be vaporized within main heat exchanger 18 or gaseous oxygen or nitrogen to be warmed within main heat exchanger 18 to ambient conditions.

Figure 2:
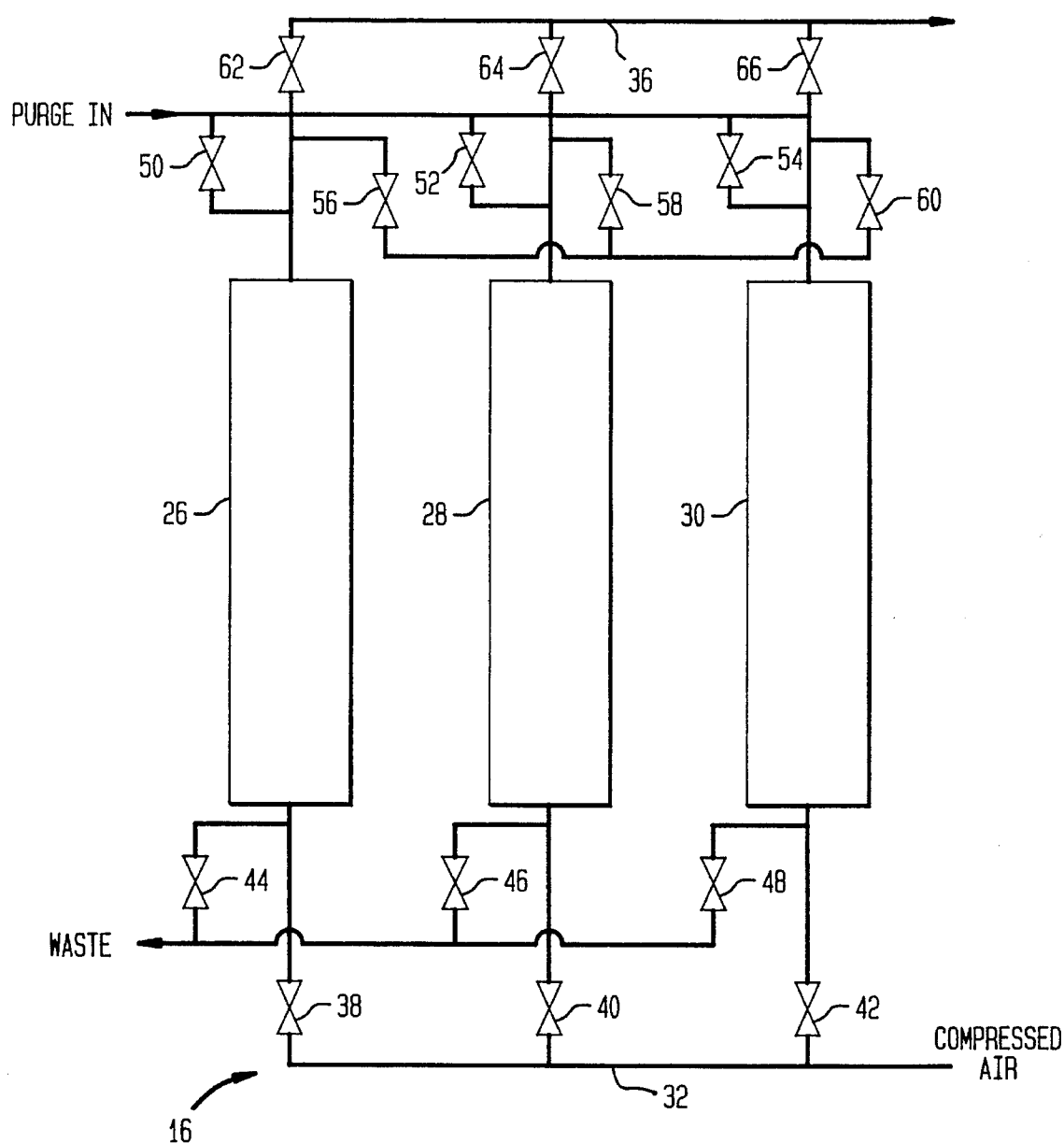
FIG. 2 is a schematic of a pre-purification unit in accordance with the present invention.

With reference to FIG. 2 pre-purification unit 16 is provided with first, second and third beds 26, 28 and 30. Each of the beds contains an adsorbent to adsorb the higher boiling impurities, for example, activated alumina (AA) 7×12 mesh beads manufactured by La Roche Chemicals, P.O. Box 1031, Airline Highway, Baton Rouge, La. 70821-1031. Compressed air from aftercooler 14 enters a header 32 and is sequentially routed each of first, second and third adsorbent beds 26–30 to produce a product stream which is discharged from a product header 36 to main heat exchanger 18.

Figure 3:
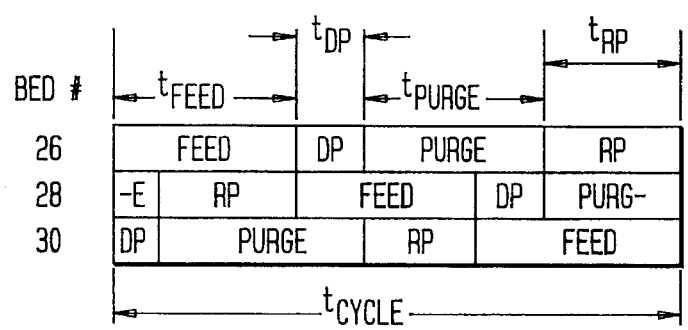
FIG. 3 is a schematic cycle diagram illustrating a pressure-swing adsorption process in accordance with the present invention.

Each of the first, second and third beds 26–30 is subjected to feed, depressurization, purge and then repressurization stages by operation of on/off valves 38–66, which although not illustrated could be remotely activated by a programmable or analog controller. With additional reference to FIG. 3, a valve sequence chart follows to describe the operation of valves 38–66 to effect pressure swing adsorption process illustrated FIG. 3. Open valves are designated by the symbol "O".

In the first half minute, valves 38, 46, 48, 52 and 62 open. As a result, the feed air stream, formed from compressed air cooled in aftercooler 14, feeds to first adsorbent bed 26 to subject first adsorbent bed 26 to a feed stage. Since valve 62 is also open, the product is discharged to product header 36 from first adsorbent bed 26. Valves 46 and 52 are open to subject the second adsorbent bed 28 to the purge stage. Open valve 48 allows third adsorbent 30 to be subjected to the depressurization stage.

At the succeeding time interval, between a half and 12 minutes, first adsorbent bed 26 continues to be subjected to the feed stage. Second adsorbent bed 28 is now, however, being subjected to a repressurization stage. To this end, valves 56 and 58 are open to subject second adsorbent bed 28 to part of the product stream at pressure. Valves 54 and 48 have opened to subject third adsorbent bed 30 to the purge stage.

During the time interval from 12 to 12.5 minutes first adsorbent bed 26 is now being subjected to depressurization. To this end, valve 44 is open. Second adsorbent bed 28 is now subjected to the feed stage by setting valves 40 and 64 in the open position. Third adsorbent bed 30 continues to be subjected to purge.

In the next time interval from 12.5 to 24 minutes first adsorbent bed 26 is subjected to the purge stage by opening valves 50 and 44. Third adsorbent bed 30 is repressurized by setting valves 58 and 60 in the open position.

The next succeeding time interval, from 24 to 24.5 minutes, has second adsorbent bed 28 being subjected to a depressurization stage by setting valve 46 in the open position. At the same time, third adsorbent bed 30, which previously was repressurized, is now subjected to the feed stage by setting valves 42 and 66 in the open position.

The last time interval, from 24.5 to 36 minutes, has first adsorbent bed 26 being repressurized (prior to being brought on-line) with part of the product stream being produced from third adsorbent bed 30. Valves 56 and 60 are set in the open position for this purpose. Second adsorbent bed 28 is now subjected to the purge stage by opening valves 52 and 46.

The above-reference sequence continuously repeats with beds acting in an adsorbing capacity followed by regeneration. As can be appreciated, in the illustrated embodiment, the time that each bed is exposed to the feed stage is equal to the purge stage and the total time of the cycle is equal to about three times the time of the purge stage or for that matter the time of the feed stage.

The following is a calculated example to show the adsorbent savings when conducting a pressure swing adsorption cycle for a pre-purification unit in accordance with the present invention as compared with prior art two bed methods. It can be seen from this example that compared to a two bed method, roughly 4,808 Kg. of adsorbent are saved with the three bed method of the present invention.

| VALVE SEQUENCE CHART | | | | | | | | | | | | | | | |
|---|---|---|---|---|---|---|---|---|---|---|---|---|---|---|---|
| Valve Number | 38 | 40 | 42 | 44 | 46 | 48 | 50 | 52 | 54 | 56 | 58 | 60 | 62 | 64 | 66 |
| Time-minutes | | | | | | | | | | | | | | | |
| 0–0.5 | O | | | | O | O | | O | | | | | O | | |
| 0.5–12 | O | | | | | O | | | O | O | O | | O | | |
| 12–12.5 | | O | | O | | O | | | O | | | | | O | |
| 12.5–24 | | O | | O | | | O | | | | O | O | | O | |
| 24–24.5 | | | O | O | O | | O | | | | | | | | O |
| 24.5–36 | | | O | | O | | | O | | O | | O | | | O |

PRODUCT: $CO_2$ = 1 ppm peak
ADSORBENT: Activated Alumina (AA) 7 × 12 mesh beads

| CASE # - # OF BEDS | PRIOR ART 2 | SUGGESTED 3 |
|---|---|---|
| Weight of Adsorbent (Kg.) | 28,852 | 24,044 |
| Weight of Adsorbent/Bed (Kg.) | 14,426 | 8,015 |
| Inner Diameter of Bed, | 2.7 | 2.25 |

-continued

PRODUCT: $CO_2$ = 1 ppm peak
ADSORBENT: Activated Alumina (AA) 7 × 12 mesh beads

| CASE # - # OF BEDS | PRIOR ART 2 | SUGGESTED 3 |
|---|---|---|
| Meters | | |
| Length of Bed, Meters | 3 | 2.4 |
| % Purge/Feed | 41.5 | 50 |
| % Vent Loss | 1 | 0.5 |
| % Max. Repressurization/Feed Flow | 9 | 1.3 |
| Feed Time, min. | 12 | 12 |
| Time Depressurization, min. | 0.5 | 0.5 |
| Time Purge, min. | 10 | 12 |
| Time Repressurization, min. | 1.5 | 11.5 |
| Total Cycle Time, min. | 24 | 36 |

For purposes of this example, the feed pressure and temperature is about 3 atmospheres at about 35° C. The feed rate is about 140 standard cubic meters per minute. The purge stream has a pressure of about 1 bara and a temperature of about 35° C. The flow rate for the purge stream is about 71 standard cubic meters minute.

In addition to the aforementioned advantage of lower adsorbent requirement, maximum fluctuation in product flow rate from pre-purification unit 16 is reduced from about 9 to 1.31. This improves the operation of the downstream air separation unit 20.

While the present invention has been described with reference to a preferred embodiment, as will occur to those skilled in the art, numerous changes, additions and omissions can be made without departing from the spirit and scope of the present invention.

I claim:

1. An integrated air separation method comprising:

separating air by compressing a feed air stream, cooling the feed air stream to a temperature suitable for its rectification, rectifying the air so that a waste stream is produced, and warming said waste stream; and prepurifying the feed air stream prior to said cooling thereof by a pressure swing adsorption process to produce a purified feed air stream;

the pressure swing adsorption process comprising subjecting each of at least three adsorbent beds to a cycle including a feed stage to adsorb impurities contained within the feed air stream and thereby to produce said purified feed air stream, a depressurization stage to initiate desorption of said impurities, a purge stage to complete desorption of said impurities and a repressurization stage to repressurize each of said at least three beds;

said purge stage being conducted by introducing said waste stream into each of said at least three adsorbent beds for a duration of a time interval equal to a total time interval of said cycle as applied to each of said at least three adsorbent beds divided by a total number of said adsorbent beds, whereby said purge stream is continuously being used to subject said adsorbent beds to said purge stage.

2. The integrated air separation method of claim 1, wherein said waste stream comprises a waste nitrogen stream.

3. The integrated air separation method of claim 1, wherein said depressurization stage is conducted by depressurizing each of said at least three beds to atmospheric pressure.

4. The integrated air separation method of claim 1, wherein said repressurization stage is conducted by introducing a part of said purified feed air stream into each of said at least three beds.

5. The integrated air separation method of claim 1, wherein said total number of beds is equal to three.

6. The integrated air separation method of claim 5, wherein said total time interval is equal to about three times a feed time interval of said feed stage.

7. The integrated air separation method of claim 6, wherein said time interval of said purge stage is about equal to said feed time interval.

8. The integrated air separation method of claim 7, wherein said waste stream comprises a waste nitrogen stream.

9. The integrated air separation method of claim 7, wherein said depressurization stage is conducted by depressurizing to atmospheric pressure.

10. The integrated air separation method of claim 7, wherein said repressurization stage is conducted by introducing a part of said purified feed stream into each of said at least three beds.

* * * * *